(12) United States Patent
Hayashi et al.

(10) Patent No.: US 8,186,832 B2
(45) Date of Patent: May 29, 2012

(54) PROJECTOR HAVING POLARIZATION CONVERSION ELEMENT ARRAY AND LIGHT SHIELDING SECTIONS PROVIDED THEREON

(75) Inventors: Daisuke Hayashi, Matsumoto (JP); Kanji Yoshida, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 414 days.

(21) Appl. No.: 12/507,191

(22) Filed: Jul. 22, 2009

(65) Prior Publication Data
US 2010/0039621 A1  Feb. 18, 2010

(30) Foreign Application Priority Data
Aug. 18, 2008  (JP) ................... 2008-209522

(51) Int. Cl.
*G03B 21/14* (2006.01)
*G03B 21/22* (2006.01)
*G02B 5/30* (2006.01)
*G02B 27/28* (2006.01)

(52) U.S. Cl. .......... 353/20; 353/97; 353/75; 359/485.04
(58) Field of Classification Search .............. 353/20, 353/97, 75; 359/485.04
See application file for complete search history.

(56) References Cited

U.S. PATENT DOCUMENTS

| 6,084,714 A | 7/2000 | Ushiyama et al. |
| 6,312,130 B2 * | 11/2001 | Haba et al. ............ 353/34 |
| 6,846,079 B2 * | 1/2005 | Ogawa et al. .......... 353/20 |
| 7,008,070 B2 * | 3/2006 | Nishida et al. ......... 362/19 |
| 7,011,412 B2 * | 3/2006 | Ogawa et al. .......... 353/20 |
| 8,038,298 B2 * | 10/2011 | Nakagawa et al. ..... 353/20 |
| 2005/0068505 A1 * | 3/2005 | Momose et al. ........ 353/97 |

FOREIGN PATENT DOCUMENTS

| JP | 11-231264 A | 8/1999 |
| JP | 2004-138746 A | 5/2004 |
| JP | 2005-106899 A | 4/2005 |
| JP | 2005-115183 A | 4/2005 |
| JP | 2007-65519 A | 3/2007 |

* cited by examiner

*Primary Examiner* — Georgia Y Epps
*Assistant Examiner* — Magda Cruz
(74) *Attorney, Agent, or Firm* — AdvantEdge Law Group, LLC

(57) ABSTRACT

A projector includes: a light source; a polarization conversion element array having an entrance surface on which an effective entrance area and an ineffective entrance area are disposed to form stripes; a modulation device adapted to modulate a linearly polarized light beam emitted from the polarization conversion element array in accordance with an image signal; a projection device adapted to project the modulated light beam; a first light shielding section, a part of the entrance surface being provided with the first light shielding section adapted to shield a part of the incident light beam to the effective entrance area; and a first opening section, the first opening section being another area of the entrance surface than the part provided with the first light shielding section, at least a part of the first opening section reaches an end of the entrance surface.

6 Claims, 10 Drawing Sheets

PROJECTOR HAVING POLARIZATION CONVERSION ELEMENT ARRAY AND LIGHT SHIELDING SECTIONS PROVIDED THEREON

BACKGROUND

1. Technical Field

The present invention relates to a projector.

2. Related Art

Projectors are apparatuses for modulating light beams, which are emitted from light sources, based on image signals to form optical images, and projecting the optical images, thus formed, on projection object surfaces such as screens via projection lenses and so on. In the past, polarization conversion element arrays for converting light beams emitted from light sources into a single type of linearly polarized light beams have been used in projectors for the purpose of improving the efficiency of the emitted light beams. Further, a part of the light beam entering the light beam entrance surface of the polarization conversion element array is input to an effective entrance area of the polarization conversion element array as an incident light beam intended to be input. In contrast, with respect to an ineffective entrance area (i.e., an area to which the incident light beam is not intended to be input) of the polarization conversion element array, there is disposed a light shielding plate for shielding the light beam on an anterior side of the entrance surface of the polarization conversion element array, for example.

JP-A-2007-65519 (Document 1) discloses a projector video apparatus provided with a polarization conversion element having a first light shielding plate and a second light shielding plate. The first light shielding plate has a plurality of first opening sections and second opening sections arranged between the first opening sections. The plurality of first opening sections each have a shape corresponding to the entrance areas (the effective entrance areas) of the polarization conversion element and is disposed at intervals corresponding respectively to a plurality of the entrance areas arranged at predetermined intervals on the entrance surface of the polarization conversion elements. The plurality of second opening sections each have an area smaller than the entrance area arranged thereon. The first light shielding is slidably provided on the polarization conversion element. The second light shielding plate has a plurality of opening sections, which has shapes corresponding to the plurality of entrance areas, arranged at predetermined intervals. According to this apparatus, by sliding the first light shielding plate with respect to the second light shielding plate, the contrast characteristic of a video image projected on a screen with reduced light intensity is improved.

Further, in JP-A-2004-138746 (Document 2), there is disclosed the fact that a light shielding section is provided to a slit-like opening plate provided with a slit corresponding to the effective area of the polarization conversion element, and the light shielding section limits the incident angle and incident orientation of the light entering a second liquid crystal panel, thereby improving the contrast.

Further, in JP-A-11-231264 (Document 3), there is disclosed the fact that the light shielding section is formed by evaporating aluminum in the ineffective entrance area of the polarization conversion element array. According to this light shielding section, since the aluminum is directly evaporated in the ineffective entrance area, the thermal conductivity is also improved in comparison with a configuration in the related art of separately disposing the light shielding plate, thus the cooling efficiency of the polarization conversion element array can be improved.

However, if the two light shielding plates, namely the first light shielding plate and the second light shielding plate, are provided as described in the Document 1, the number of components of the light shielding plates is increased, and the sliding structure becomes complicated, which causes a problem of increasing the component cost and the assembling cost of the projection video apparatus. Further, when cooling the polarization conversion element using a cooling fan, there is a conceivable problem that the use of two light shielding plates causes the cooling air to be blocked, which degrades the efficiency of cooling the polarization conversion element. Further, since the configuration of the Document 2 is substantially the same as the related art configuration, the efficiency of cooling the polarization conversion element is also substantially the same as that in the related art. Therefore, projectors capable of improving the efficiency of cooling the polarization conversion element array, and improving the contrast of the projected images have been requested.

SUMMARY

An advantage of some aspects of the invention is to solve at least a part of the problems described above, and the invention can be realized as following aspects or application examples.

An aspect of the invention is directed to a projector including a light source, a polarization conversion element array having an entrance surface on which an effective entrance area and an ineffective entrance area are disposed to form stripes, an incident light beam emitted from the light source being required to pass through the effective entrance area, but not to pass through the ineffective entrance area, a modulation device adapted to modulate a linearly polarized light beam emitted from the polarization conversion element array in accordance with an image signal, and a projection device adapted to project the modulated light beam. The projector further comprises a first light shielding section and a first opening section. The entrance surface is provided with a first light shielding section adapted to shield a part of the incident light beam to the effective entrance area. The first opening section is another area of the entrance surface than the part provided with the first light shielding section. At least of a part of the first opening section reaches an end of the entrance surface.

According to the configuration described above, it becomes suitable for adjusting the contrast of an image displayed of a screen in accordance with, for example, the viewing angle characteristic of the Modulation device, thus the contrast can be improved. In addition, when the first light shielding section is a thin film provided with the opening section and the light shielding section is formed on the entrance surface, the cooling efficiency of the polarization conversion element array can be improved. Further, by forming at least a part of the opening section to reach an end of the entrance surface, in the mask as a jig used for forming the thin film on the entrance surface, the mask member for forming the opening section can be coupled to be formed of a single constituent. Therefore, compared to the case of preparing the mask formed of separate members and forming the thin film with the mask, the formation of the mask on the entrance surface can efficiently be executed, the misalignment of the opening section with respect to the entrance surface can be reduced, and the thin film can be formed with high accuracy.

An aspect of the invention is directed to the projector according to the previously described aspect, wherein the projector further includes a light shielding member having a second opening section and a second light shielding section. The second opening section is formed like a stripe corresponding to the effective entrance area. The second light shielding section is adapted to shield the incident light beam is preferably provided.

In the case in which a part of the area of the opening section is formed to reach the outline of the entrance surface, a part of the area of the opening section formed in the ineffective entrance area may occur in some cases. However, since the part of the area formed in the ineffective entrance area can be shielded by the light shielding member having such a configuration, the light beam can be prevented from entering the area formed in the ineffective entrance area of the opening section formed on the entrance surface.

An aspect of the invention is directed to the projector of any of the above aspects of the invention, wherein the first light shielding section is preferably a metallic thin film.

According to the configuration described above, since the thin film light shielding section formed on the entrance surface is formed of the metallic thin film, in the case of forming the light shielding section, for example, of an aluminum thin film, the incident light beam can reliably be shielded. Further, since the thin film is made of metal, the thin film has good thermal conductivity, and it is also possible to improve the cooling efficiency of the polarization conversion element array.

An aspect of the invention is directed to the projector of any of the above aspects of the invention, wherein the light shielding sections of the thin film is preferably formed of a dielectric multilayer film for shielding at least a part of the wavelength band in the wavelength band of the incident light beams.

According to such a configuration as described above, since the dielectric multilayer film shields at least a part of the wavelength band in the wavelength band of the incident light beams, the white balance can be adjusted with respect to the color temperature of the light beams (the incident light beams) emitted by the light source, and therefore the color balance of the entire image projected on the screen or the like can be adjusted. Further, it is also possible to shield the entire wavelength band (visible light) of the incident light beam.

An aspect of the invention is directed to the projector of any of the above aspects of the invention, wherein the dielectric multilayer film preferably shields at least a wavelength band of green light and blue light of the incident light beam.

According to such a configuration as described above, the dielectric multilayer film shields the wavelength band of the green light and the blue light, and transmits the red light. Thus, in the case in which the light beam emitted from the light source is high in the color temperature and appears bluish white, by shielding the green light and the blue light while transmitting the red light, namely by relatively increasing the light intensity ratio of the red light, it becomes possible to lower the color temperature of the light beam emitted from the dielectric multilayer film to adjust the white balance toward a reddish white color.

An aspect of the invention is directed to the projector of any of the above aspects of the invention, wherein the modulation device preferably includes an entrance side polarization plate to which the linearly polarized light beam is input, a liquid crystal panel adapted to modulate the light beam transmitted through the entrance side polarization plate, and an exit side polarization plate adapted to transmit the light beam modulated by the liquid crystal panel, and the first opening section of the entrance surface is formed so that an F-number relative to an area corresponding to a polarization axis direction of each of the entrance side polarization plate and the exit side polarization plate becomes smaller compared to an F-number relative to an area corresponding to a direction tilted from the polarization axis direction.

According to such a configuration as described above, by setting the area of the opening section in the polarization axis direction of each of the entrance side polarization plate and the exit side polarization plate to be larger than the area of the opening section in the direction tilted from the polarization axis direction, it is possible to improve the viewing angle characteristics of the entrance side polarization plate and the exit side polarization plate, and further to improve the contrast of the entire image to be projected.

BRIEF DESCRIPTION OF THE DRAWINGS

The invention will now be described with reference to the accompanying drawings, wherein like numbers reference like elements.

FIG. 9 is a diagram showing a viewing angle characteristic in the contrast the polarization plate is provided with.

DESCRIPTION OF AN EXEMPLARY EMBODIMENT

An embodiment of the invention and some modified examples thereof will hereinafter be explained with reference to the accompanying drawings.

Embodiment

Figure 1:
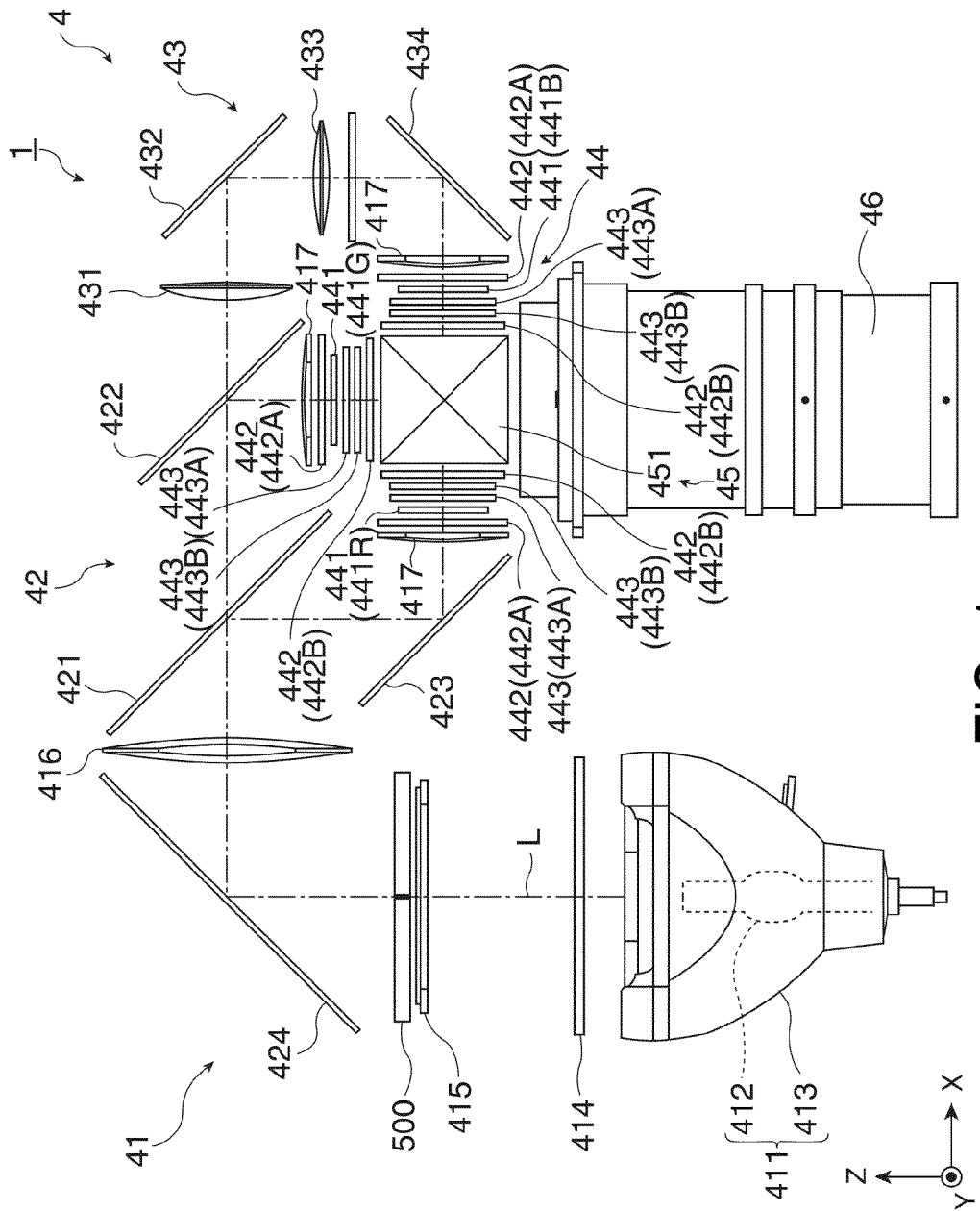
FIG. 1 is a diagram showing a schematic configuration of an optical system of a projector according to an embodiment of the invention.

FIG. 1 is a diagram showing a schematic configuration of an optical system of a projector according to the present embodiment of the invention. A configuration and an operation of the optical system 4 will be explained with reference to FIG. 1.

The optical system 4 of the projector 1 is provided with an integrator illumination optical system 41 as an illumination optical device, a color separation optical system 42, a relay optical system 43, a modulation device 44, a color combining optical system 45, and a projection lens 46 as a projection device.

The integrator illumination optical system 41 is an optical system 4 for substantially evenly illuminating the image forming area of the three liquid crystal panels 441 (the liquid crystal panels 441 for respective colored light beams of red light beam, green light beam, and blue light beam are represented as liquid crystal panels 441R, 441G, and 441B, respectively) forming the modulation device 44. The integrator illumination optical system 41 is provided with a light source 411, a first lens array 414, a second lens array 415, a polarization conversion unit 500, a reflecting mirror 424, and an overlapping lens 416.

The light source 411 has a light source lamp 412 as a radial light source for emitting a radial light ray (light beam), and a reflector 413 for reflecting the radial light emitted from the light source lamp 412. Further, the radial light beam emitted from the light source lamp 412 is reflected by the reflector 413 to be a substantially parallel light beam, and then emitted to the outside. Although a high-pressure mercury lamp is adopted as the light source lamp 412 in the present embodiment, a metal halide lamp or a halogen lamp can also be adopted. Further, although a parabolic mirror is adopted as the reflector 413 in the present embodiment, the reflector is not so limited, but the configuration of including a reflector of an ellipsoidal mirror and a concave collimation lens disposed on the exit surface side of the reflector can also be adopted.

The first lens array 414 has a configuration in which small lenses each having a substantially rectangular outline viewed in the illumination light axis L direction are arranged in a matrix. The small lenses divide the beam emitted from the light source lamp 412 into a plurality of partial light beams.

The second lens array 415 has substantially the same configuration as the first lens array 414, namely the configuration having small lenses arranged in a matrix. The second lens array 415, in conjunction with the overlapping lens 416, has a function of focusing the image of the small lenses of the first lens array 414 on the liquid crystal panels 441.

The polarization conversion unit 500 is disposed at a posterior stage to the second lens array 415. The polarization conversion unit 500 is for converting the light beams from the second lens array 415 into a substantially single type of polarized light beams, and thus improving the light efficiency in the modulation device 44. The polarization conversion unit 500 will be described later in detail.

The partial light beams converted into the substantially single type of polarized light beams by the polarization conversion unit 500 are finally overlapped substantially on the liquid crystal panels 441R, 441G, and 441B of the modulation device 44 by the overlapping lens 416. In the projector 1 of the present embodiment using a type of the liquid crystal panels 441 of modulating the polarized light beams, since only the single type of polarized light beams are available in the modulation device 44, roughly a half of the light beams from the light source lamp 412, which emits many types of random polarized light beams, are not available. Therefore, by using the polarization conversion unit 500, almost all of the light beams emitted from the light source lamp 412 are converted into the single type of polarized light beams, thereby improving the light efficiency in the modulation device 44.

The color separation optical system 42 is provided with two dichroic mirrors 421, 422 and a reflecting mirror 423, and has a function of separating the plurality of partial light beams emitted from the integrator illumination optical system 41 into three colored light beams of the red light beam, the green light beam, and the blue light beam by the dichroic mirrors 421, 422.

The relay optical system 43 is provided with an entrance lens 431, a relay lens 433, and reflecting mirrors 432, 434, and has a function of guiding the colored light beam (the blue light beam in the present embodiment) obtained by the separation operation of the color separation optical system 42 to the liquid crystal panel 441B.

In this case, the dichroic mirror 421 of the color separation optical system 42 transmits the blue light component and the green light component of the light beam emitted from the integrator illumination optical system 41, and reflects the red light component thereof. The red light beam reflected by the dichroic mirror 421 is further reflected by the reflecting mirror 423 and reaches the liquid crystal panel 441R for the red light beam through a field lens 417. The field lens 417 converts each of the partial light beams emitted from the second lens array 415 into a light beam parallel to the center axis (the principal ray) thereof. The same applies to other field lenses 417 disposed on the light entrance side of the other respective liquid crystal panels 441G, 441B.

Among the green light beam and the blue light beam transmitted through the dichroic mirror 421, the green light beam is reflected by the dichroic mirror 422, and reaches the liquid crystal panel 441G for the green light beam through the field lens 417. Meanwhile the blue light beam is transmitted through the dichroic mirror 422, passes through the relay optical system 43, and then reaches the liquid crystal panel 441B for the blue light beam through the field lens 417. It should be noted that the relay optical system 43 is used for the blue light beam for preventing degradation of light efficiency caused by the diffusion of the blue light beam, since the blue light beam has the optical path longer than the optical paths of other colored light beams. In other words, it is provided for transmitting the partial light beams, which have entered the entrance lens 431, directly to the field lens 417.

The modulation device 44 is provided with the three liquid crystal panels 441 (441R, 441G, and 441B) to be the three light modulation devices, polarization plates 442, and optical compensation plates 443. It should be noted that as the liquid crystal panels 441R, 441G, and 441B, liquid crystal acting as the TN type is used in the present embodiment. Further, as the liquid crystal panels 441R, 441G, and 441B, liquid crystal acting as a vertically aligned type can also be used.

The colored light beams obtained by the separation operation of the color separation optical system 42 are respectively modulated by the three liquid crystal panels 441R, 441G, and 441B and the polarization plates 442 provided on both of the light beam entrance side and the light beam exit side of these liquid crystal panels based on the image information, thereby forming an optical image.

Each of the polarization plates 442 includes an entrance side polarization plate 442A disposed at an anterior stage of the corresponding liquid crystal panel 441 (441R, 441G, or 441B) and an exit side polarization plate 442B disposed at a posterior stage thereof. The entrance side polarization plate 442A is for transmitting only a polarized light beam with a predetermined polarizing direction out of each of the colored light beams separated off by the color separation optical system 42 and absorbing other polarized light beams, and is composed of a substrate made of sapphire glass or the like and a polarization film attached thereto. Further, it is also possible to attach the polarization film to the field lens 417 instead of using the substrate.

The exit side polarization plate 442B is also configured similarly to the entrance side polarization plate 442A, and is for transmitting only the polarized light beam with the predetermined polarizing direction out of the light beams emitted from the corresponding liquid crystal panels 441 (441R, 441G, or 441B) and absorbing other polarized light beams, and is composed of a substrate made of sapphire glass or the like and a polarization film attached thereto. Further, it is also possible to attach the polarization film to the cross dichroic prism 451 instead of using the substrate. It should be noted that the polarization plates 442 of the present embodiment have a rectangular shape, and assuming that the long side direction thereof is newly defined as an X-axis direction, and the short side direction thereof is newly defined as a Y-axis direction, the entrance side polarization plate 442A and the exit side polarization plate 442B thereof are set to have the directions of the polarization axes of the Y-axis direction and the X-axis direction, respectively, perpendicular to each other.

Each of the optical compensation plates 443 corrects an influence on viewing angle characteristic of the corresponding liquid crystal panel 441 due to the fact that the refractive index of the liquid crystal molecules varies in accordance with the direction thereof. Further, since the TN type liquid crystal is used in the present embodiment, each of the optical compensation plates 443 is composed of a pair of sheets. In detailed explanations, each of the optical compensation plates 443 is provided with a first optical compensation plate 443A and a second optical compensation plate 443B both disposed at a subsequent stage of the corresponding liquid crystal panel 441 (441R, 441G, or 441B).

The first optical compensation plate 443A is disposed at a subsequent stage of the corresponding liquid crystal panel 441, and for executing a correction of the viewing angle characteristic in the vertical direction of the liquid crystal panel 441 on the modulated light beam emitted from the liquid crystal panel 441. Further, the first optical compensation plate 443A is obtained by bonding an optical conversion film on a transparent glass substrate, or by depositing an optical conversion film evaporated on a transparent glass substrate. The second optical compensation plate 443B is disposed at a subsequent stage of the first optical compensation plate 443A, and for executing a correction of the viewing angle characteristic in the lateral direction of the corresponding liquid crystal panel 441 on the modulated light beam emitted from the liquid crystal panel 441. Further, the second optical compensation plate 443B is also obtained by bonding an optical conversion film on a transparent glass substrate, or by depositing an optical conversion film evaporated on a transparent glass substrate similarly to the case of the first optical compensation plate 443A. The first optical compensation plate 443A and the second optical compensation plate 443B correct the viewing angle characteristic of the corresponding liquid crystal panel 441, thereby improving the contrast of the projection image.

The color combination optical system 45 is composed of the cross dichroic prism 451. The cross dichroic prism 451 is for combining optical images each modulated for corresponding colored light beam emitted from respective one of the three liquid crystal panels 441R, 441G, and 441B to form a color optical image. It should be noted that the cross dichroic prism 451 is composed of a dielectric multilayer film for reflecting red light and a dielectric multilayer film for reflecting blue light formed along the boundary faces of four rectangular prisms to form a substantially X shape, and the three colored light beams are combined by these dielectric multilayer films.

The projection lens 46 is configured as a combination lens composed of a plurality of lenses combined with each other, and projects the color optical image (the color image), which is combined by the cross dichroic prism 451, on the screen. The projection lens 46 is provided with a lever (not shown) for altering relative positions of the plurality of lenses, and is configured so that the focus adjustment and the zoom adjustment of the color image projected can be performed. It should be noted that the optical components 41 through 46 forming the optical system 4 are housed at a predetermined place of an optical component housing (not shown), and are disposed inside the main body of the projector 1.

It should be noted that inside the main body of the projector 1, there are disposed a cooling fan (not shown) and a duct (not shown) for flowing the fresh air taken in by the cooling fan. The cooling fan and the duct discharge the fresh air thus taken in to the components, which generate heat in response to drive of the optical system 4, such as the light source 411, the polarization conversion unit 500, the liquid crystal panels 441, and the polarization plates 442, thereby cooling the components.

Figure 2:
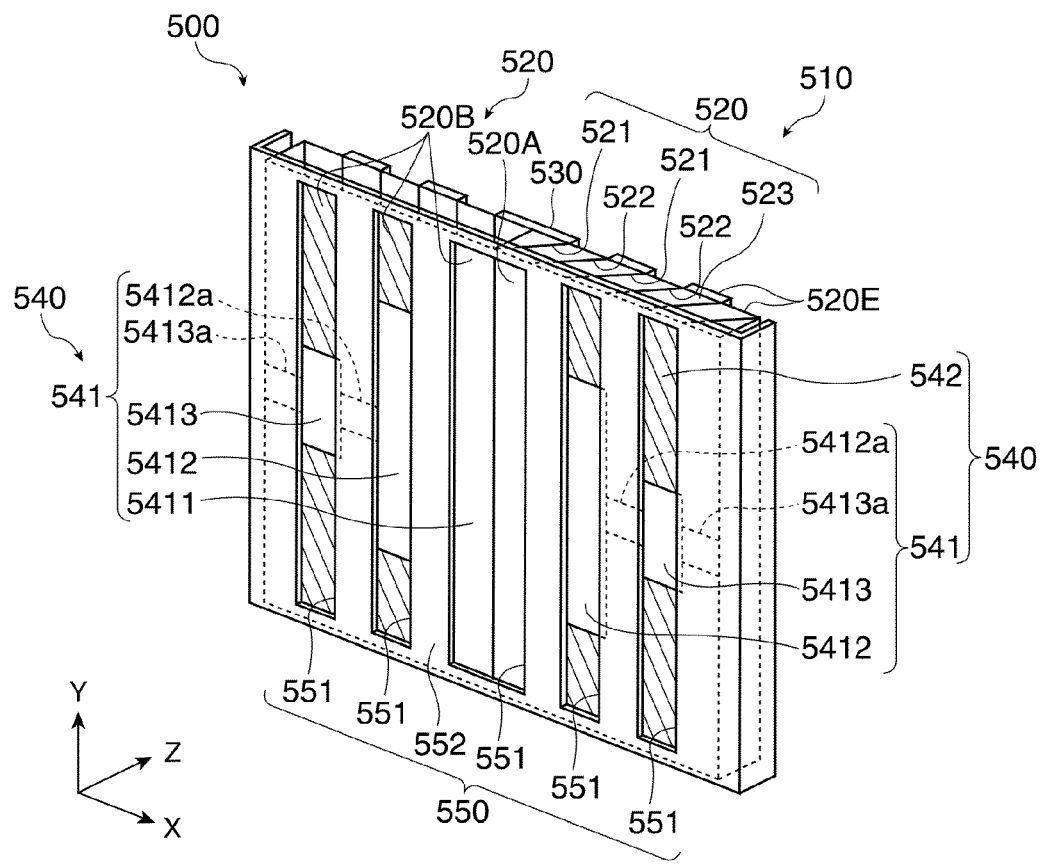
FIG. 2 is a perspective view of a polarization conversion unit viewed from a light beam entrance side.
Figure 3:
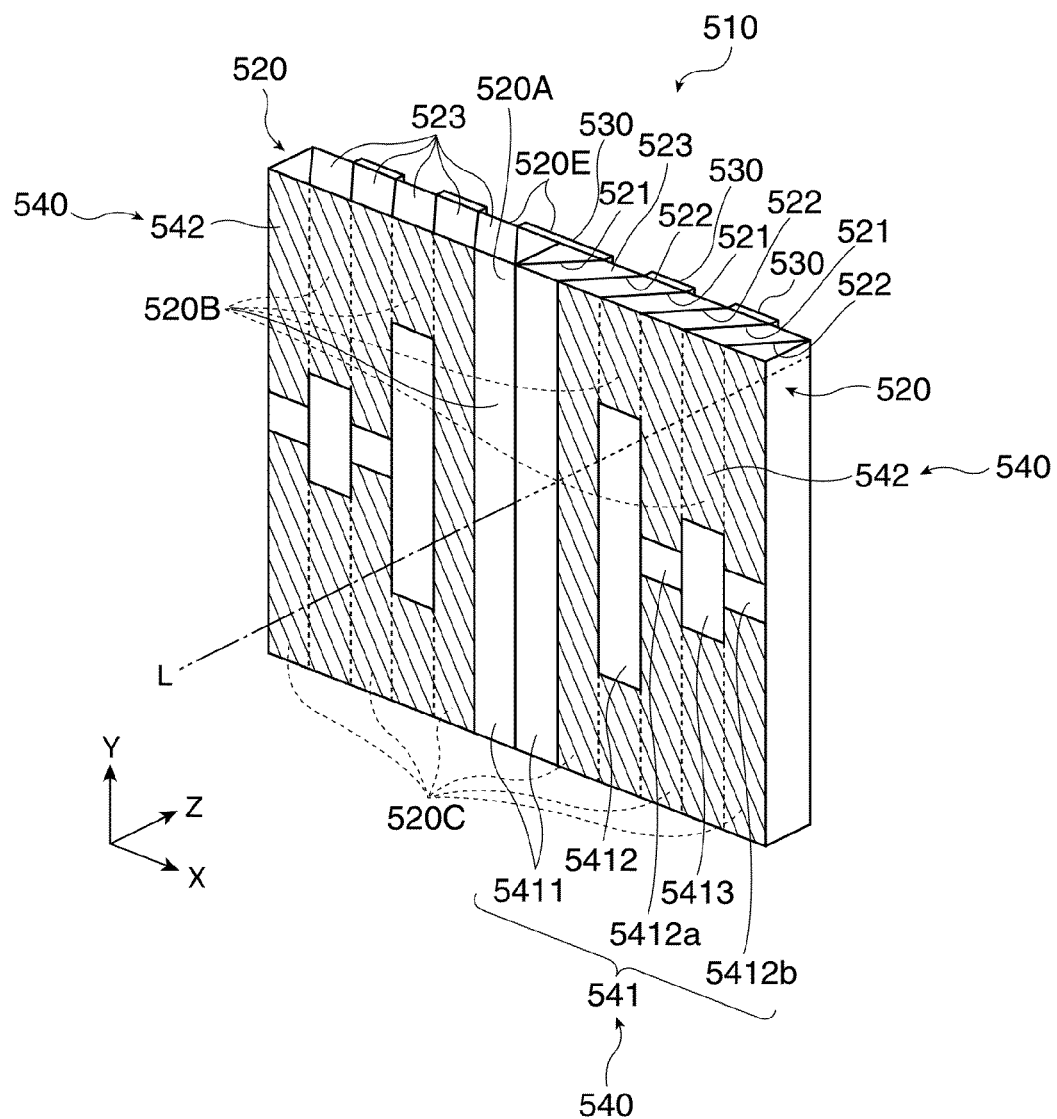
FIG. 3 is a perspective view of a polarization conversion element array viewed from the light beam entrance side.
Figure 4:
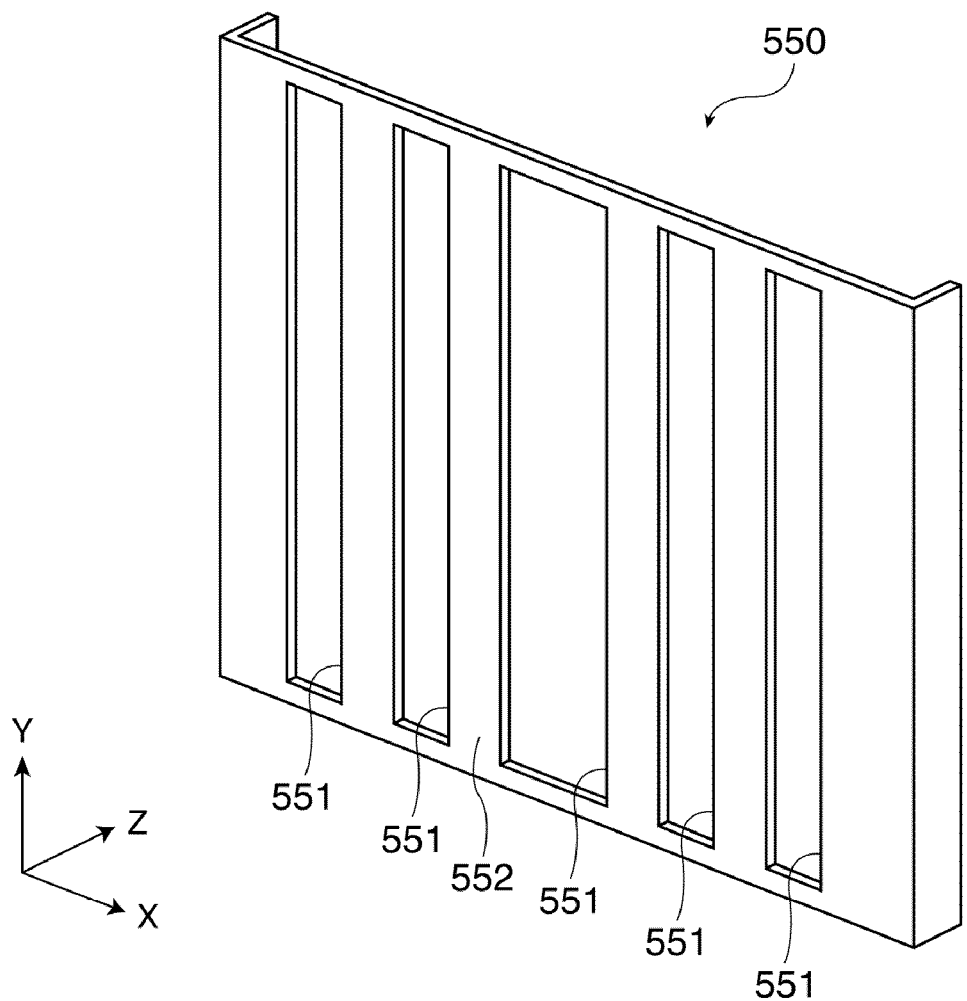
FIG. 4 is a perspective view of a light shielding plate viewed from the light beam entrance side.

FIG. 2 is a perspective view of the polarization conversion unit viewed from the light beam entrance side. FIG. 3 is a perspective view of the polarization conversion element array viewed from the light beam entrance side. FIG. 4 is a perspective view of the light shielding plate viewed from the light beam entrance side. A configuration of the polarization conversion unit 500 will be explained with reference to FIGS. 2 through 4.

As shown in FIGS. 2 through 4, the polarization conversion unit 500 is composed of the polarization conversion element array 510 and the light shielding plate 550. It should be noted that the light shielding plate 550 is disposed at an anterior stage of the polarization conversion element array 510.

As shown in FIGS. 2 and 4, the light shielding plate 550 is composed of opening sections 551 as second opening sections and light shielding sections 552 as second light shielding sections. Further, the opening sections 551 of the light shielding plate 550 are formed so as to be corresponding to the effective entrance areas 520B of the polarization conversion element array 510 described later, and to have slit shapes along the respective effective entrance areas 520B, and make the light beams enter the effective entrance areas 520B of the polarization conversion element array 510. Further, the light shielding sections 552 of the light shielding plate 550, which is other portions than the opening sections 551, are disposed so as to be corresponding to ineffective entrance areas 520C adjacent to the respective effective entrance areas of the polarization conversion element array 510, and shield the light beams so as not to enter the ineffective entrance areas 520C. It should be noted that in the present embodiment a stainless-steel member, which has a surface with improved reflectivity on the side to which the light beam is input, is used as the light shielding plate 550. It should be noted that as the light shielding plate 550 a metal member such as an aluminum alloy member can also be used besides the stainless-steel member. Further, any member which does not transmit the incident light beams can be adopted as the light shielding plate 550.

It should be noted that the light beams emitted from the second lens array 415 are each a light beam converged by the corresponding small lens and having a random polarization axis. The light shielding plate 550 makes such light beams enter the effective entrance areas 520B of the polarization conversion element array 510 via the opening sections 551, thereby generating effective polarized light beams. Further, the light shielding plate 550 shields the light beams with the light shielding sections 552, thereby preventing the light beams from entering the ineffective entrance areas 520C of the polarization conversion element array 510 to generate the ineffective polarized light beams.

As shown in FIGS. 2 and 3, the polarization conversion element array 510 is configured including plate-like polarization conversion elements 520 and a plurality of (five in the present embodiment) reed-shaped retardation plates 530. Further, the polarization conversion element array 510 is obtained by forming a thin film 540 on entrance surfaces 520A described later.

The polarization conversion unit 500 separates the light beams entering the effective entrance areas 520B of the polarization conversion element array 510 via the opening sections 551 of the light shielding plate 550 into two types of linearly polarized light beams with the polarization conversion element array 510, directly emits one of the two types of linearly polarized light beams, and emits to the posterior stage the other of the two types of linearly polarized light beams after converting the polarization axis thereof into the same polarization axis of the one of the two types of the polarization beams by rotating the polarization axis thereof 90° with the retardation plates 530 described later.

As shown in FIG. 3, in a detailed explanation, the polarization conversion element array 510 is configured to have a form obtained by bonding two plate-like polarization conversion elements 520 to each other on the end faces thereof so as to produce a symmetric appearance in the X-axis direction. The polarization conversion elements 520 are provided with a plurality of polarization splitting films 521 disposed obliquely to the incident light beam (disposed at an angle of roughly 45° with the illumination light axis L), reflecting films 522 disposed in parallel alternately between the polarization splitting films 521, and translucent members 523 disposed so as to interpose between the polarization splitting films 521 and the reflecting films 522.

Further, the polarization conversion elements 520, in other words, are formed to have a plate-like shape by arranging a plurality of translucent members 523 as columnar members each having a parallelogram shape so that the translucent members 523 have the polarization splitting films 521 and the reflecting films 522 alternately on the both end faces thereof.

The polarization splitting films 521 are each formed of a dielectric multilayer film. The polarization splitting films 521 are for reflecting the light beams (S-polarized light beams in the present embodiment) as the one of the two types of linearly polarized light beams having the polarization axis parallel to the entrance surfaces of the polarization splitting films 521 in the incident light beam while transmitting the light beams (P-polarized light beams) each having the polarization axis perpendicular to that of the S-polarized light beam, thereby splitting the incident light beams having passed through the effective entrance areas 520B into the two types of linearly polarized light beams.

The reflecting films 522 are each made of a single metal material having high reflectivity such as aluminum, gold, silver, copper, or chromium, or an alloy including two or more kinds of these metals, and reflect the S-polarized light beams which are the reflected one of the two types of linearly polarized light beams obtained by the splitting operation of the respective polarization splitting films 521. It should be noted that it is possible to use equivalents of the polarization splitting films 521 as the reflecting films 522 for reflecting the S-polarized light beams. The translucent members 523 are for transmitting the light beams through the inside thereof and are made of white crown glass in the present embodiment.

The retardation plates 530 are formed of λ/2 wave plates, and for rotating the polarization axis of the P-polarized light beams 90°, which are transmitted one of the two types of linearly polarized light beams obtained by the splitting operation of the polarization splitting films 521, to convert the P-polarized light beams into the S-polarized light beams as the other of the two types of linearly polarized light beams. As shown in FIG. 3, the retardation plates 530 are bonded on the light beam exit surface 520E (here, the exit surfaces of the retardation plates 530) of each the polarization conversion elements 520 at positions corresponding to the polarization splitting films 521 when viewed in the direction along the illumination light axis L.

In the polarization conversion element array 510 thus configured, the surfaces of the polarization conversion elements 520 forming a side the light beams are input to are collectively referred to as an entrance surface 520A. Further, the surfaces of the polarization conversion elements 520 and the retardation plates 530 forming the side from which the incident light beams are emitted after the polarization conversion are referred to as exit surfaces 520E.

According to the configuration described above, the entrance surface 520A is composed of a plurality of effective entrance areas 520B forming areas (areas where the incident light beams are treated as effective ones) where desired polarization conversion can be executed on the incident light beams, and a plurality of ineffective entrance areas 520C forming areas (areas where the incident light beams are treated as ineffective ones) where the desired polarization conversion cannot be executed on the incident light beams, in contrast. In the entrance surface 520A, the effective entrance areas 520B and the ineffective entrance areas 520C are arranged alternately at a predetermined interval (a pitch with which the translucent members 523 are arranged).

Further, on the entrance surface 520A of the polarization conversion element array 510, there is formed a thin film 540. The thin film 540 is formed in the present embodiment using a vapor deposition method described later. The thin film 540 is formed to have opening sections 541 for allowing the incident light beams to pass therethrough and light shielding sections 542 for shielding the incident light beams not entering the effective entrance areas 520B. The opening sections 541 are formed along the effective entrance areas 520B in accordance with the effective entrance areas 520B, while the shielding sections 542 are formed in the areas other than the opening sections 541.

The opening sections 541 are composed of first opening sections 5411, second opening sections 5412, and third opening sections 5413. Further, the opening sections 541 are formed on the entrance surface 520A so as to produce a bilaterally symmetric appearance in the X-axis direction and a vertically symmetric appearance in the Y-axis direction centered on the illumination light axis L. In detail, the first opening sections 5411 are formed in the effective entrance areas 520B located at the center area of the entrance surface 520A so as to reach the outer shape ends of the entrance surface 520A in the vertical direction (the Y-axis direction) of the entrance surface 520A. In other words, the second opening sections 5412 each have a portion surrounded by the light shielding sections 542 in three directions at each of the vertical ends thereof. Further, the second opening sections 5412 are formed in the subsequent effective entrance areas 520B apart from the center area in the lateral direction at areas located the same distance apart inward from the vertical outer shape ends. The third opening sections 5413 set to be shorter in the vertical size than the second opening sections 5412 are formed in the subsequent effective areas 520B to the second opening sections 5412 in the lateral direction at areas located the same distance apart inward from the vertical outer shape ends. In other words, the third opening sections 5413 each have also a portion surrounded by the light shielding sections 542 in three directions at each of the vertical ends thereof.

It should be noted that the second opening sections 5412 and the third opening sections 5413 limit the incidence azimuth of the light beams entering the polarization plates 442 in accordance with the contrast viewing angle characteristic of the polarization plates 442 described later. For that purpose, in the effective entrance areas 520B where the second opening sections 5412 and the third opening sections 5413 are formed, there are disposed light shielding sections 542 above and below the second opening sections 5412 and the third opening sections 5413.

It should be noted that each of the second opening sections 5412 and the corresponding one of the third opening sections 5413 are connected to each other via a connecting opening section 5412a provided to the ineffective entrance area 520C. Further, each of the third opening sections 5413 and the outer shape end of the entrance surface 520A in the lateral direction are connected via a connecting opening section 5413a provided to the ineffective entrance area 520C.

Thus, the opening areas 541 have the first opening sections 5411 each having a shape connected to the outer shape ends of the entrance surface 520A in the vertical direction. Further, the opening sections 541 have the second opening sections 5412 and the third opening sections 5413 having shapes connected to the outer shape ends of the entrance surface 520A in the lateral direction via the connecting opening sections 5412a, 5413a, respectively. It should be noted that in the entrance surface 520A, the thin film 540 formed in the areas other than the opening sections 541 corresponds to the light shielding sections 542.

Figure 5:
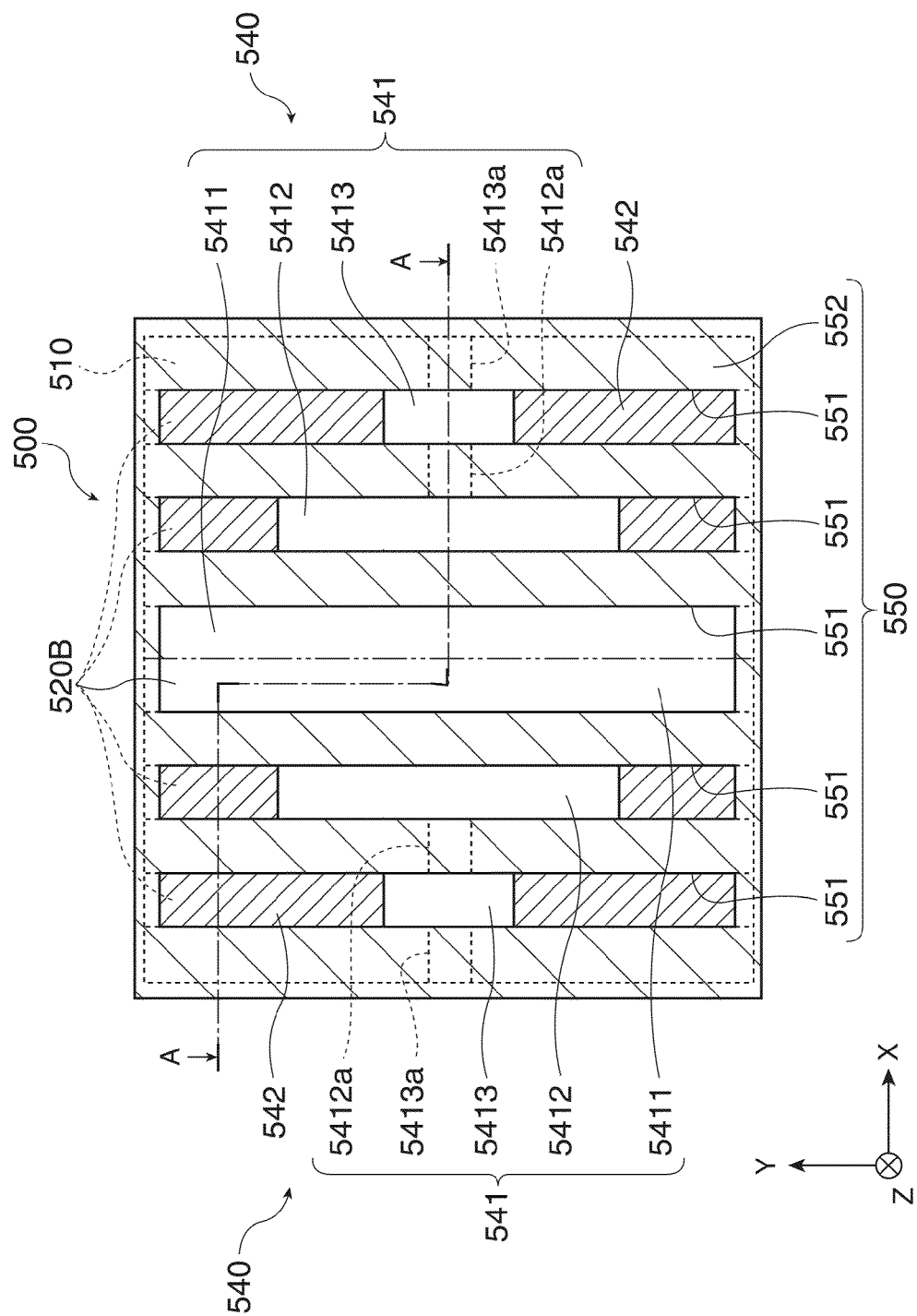
FIG. 5 is a front view of the polarization conversion unit viewed from the light beam entrance side.

FIG. 5 is a front view of the polarization conversion unit viewed from the light beam entrance side. As shown in FIG. 5, the opening sections 541 formed on the entrance surface 520A of the polarization conversion element array 510 are formed so as to be corresponding to the opening sections 551 of the light shielding plate 550. It should be noted that there is created the condition in which the light shielding sections 542 above and below the second opening sections 5412 and the third opening sections 5413 formed in the effective entrance areas 520B are exposed via the opening sections 551 of the light shielding plate 550.

Therefore, the light beams entering through the opening sections 551 of the light shielding plate 550 enter the first opening sections 5411, the second opening sections 5412, and the third opening sections 5413. Then, in the light shielding sections 542 thus exposed above and below the second opening sections 5412 and the third opening sections 5413, the light beams entering through the opening sections 551 of the light shielding plate 550 are reflected (shielded).

Further, the connecting opening sections 5412a, 5413a formed in the ineffective entrance areas 520C are set in a condition of being shielded by the light shielding sections 552 of the light shielding plate 550. Therefore, no light beam is input to the connecting opening sections 5412a, 5413a.

Figure 6:
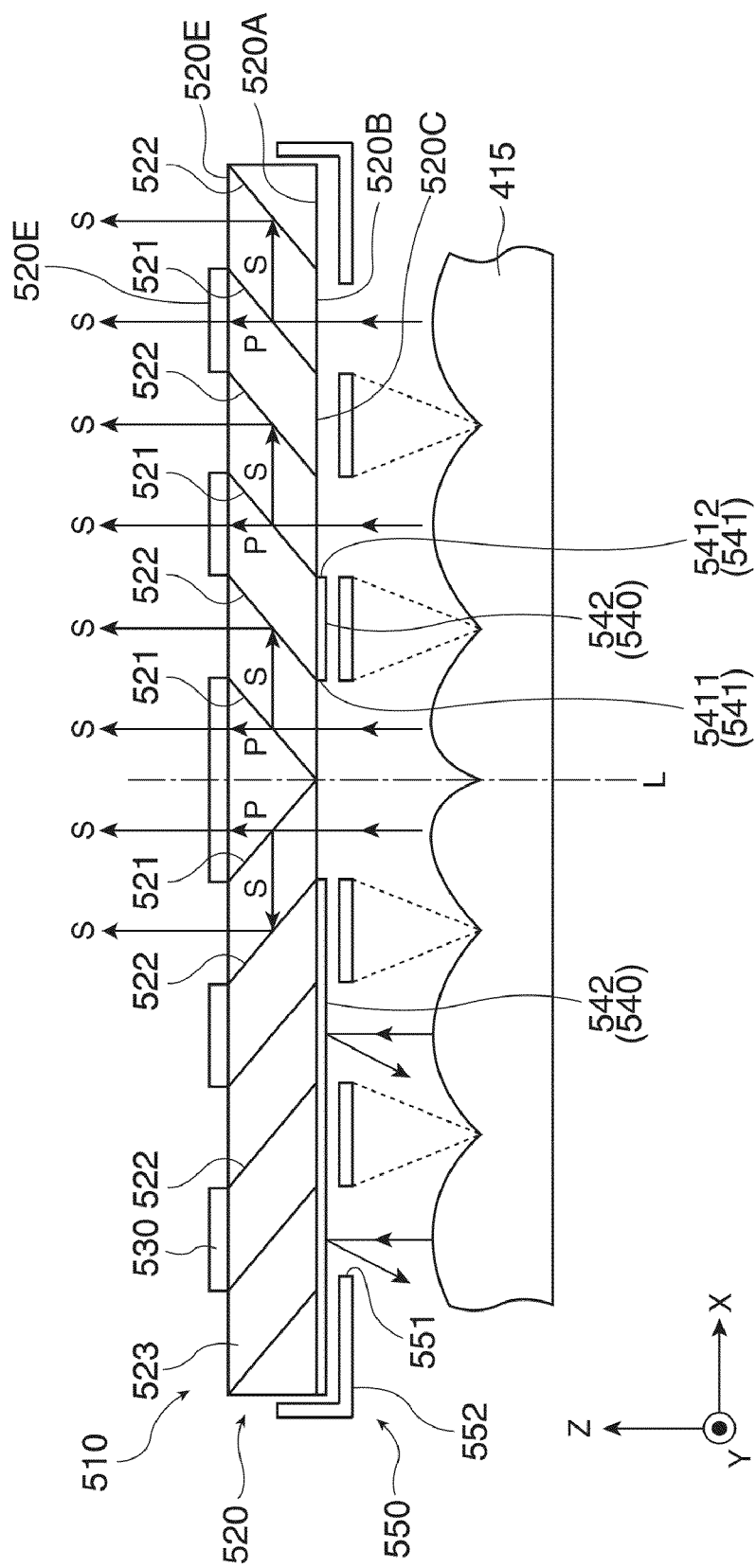
FIG. 6 is a schematic cross-sectional view of the polarization conversion unit.

FIG. 6 is a schematic cross-sectional view of the polarization conversion unit. It should be noted that FIG. 6 is a cross-sectional view along the A-A line shown in FIG. 5. Further, FIG. 6 also shows a partial cross-sectional view of the second lens array 415. An operation of the polarization conversion unit 500 will be explained with reference to FIG. 6.

The light beams emitted from the second lens array 415 are light beams having random polarization axes collected by the respective small lenses, and enter a predetermined area of the polarization conversion unit 500. It should be noted that as illustrated with the broken lines shown in FIG. 6, among the light beams emitted from the second lens array 415, the light beams generating ineffective polarized light beams to be input to the ineffective entrance areas 520C of the polarization conversion element array 510 are blocked (shielded) by the light shielding sections 552 of the light shielding plate 550.

The light beams entering through the opening sections 551 of the light shielding plate 550 enter the opening sections 541 provided to the thin film 540. The light beams entering the opening sections 541 are transmitted through the translucent members 523, and split by the polarization splitting film 521 into the P-polarized light beams and the S-polarized light beams. The P-polarized light beams are transmitted through the polarization splitting films 521 while the S-polarized light beams are reflected by the polarization splitting films 521 and the light paths thereof are changed approximately 90°.

The S-polarized light beams reflected by the polarization splitting films 521 are further reflected by the reflecting films 522 to be changed approximately 90° again in the light path, then proceed in substantially the same directions as the entrance direction to the polarization conversion element array 510, and are emitted from the exit surfaces 520E of the polarization conversion elements 520. Further, the P-polarized light beams transmitted through the polarization splitting films 521 enter the retardation plates 530 to be rotated 90° in the polarization axis, thus being converted into the S-polarized light beams, and are emitted from the exit surfaces 520E of retardation plates 520E as the S-polarized light beams. Therefore, the light beams emitted from the polarization conversion unit 500 are uniformed to be the S-polarized light beams as a substantially single type of linearly polarized light beams.

It should be noted that as described above, on the left side of the illumination light axis L shown in FIG. 6, the light beams entering through the opening sections 551 of the light shielding plate 550 are reflected (shielded) by the light shielding sections 542 exposed above and below the second opening sections 5412 and the third opening sections 5413, and are not input to the translucent members 523.

Figure 7:
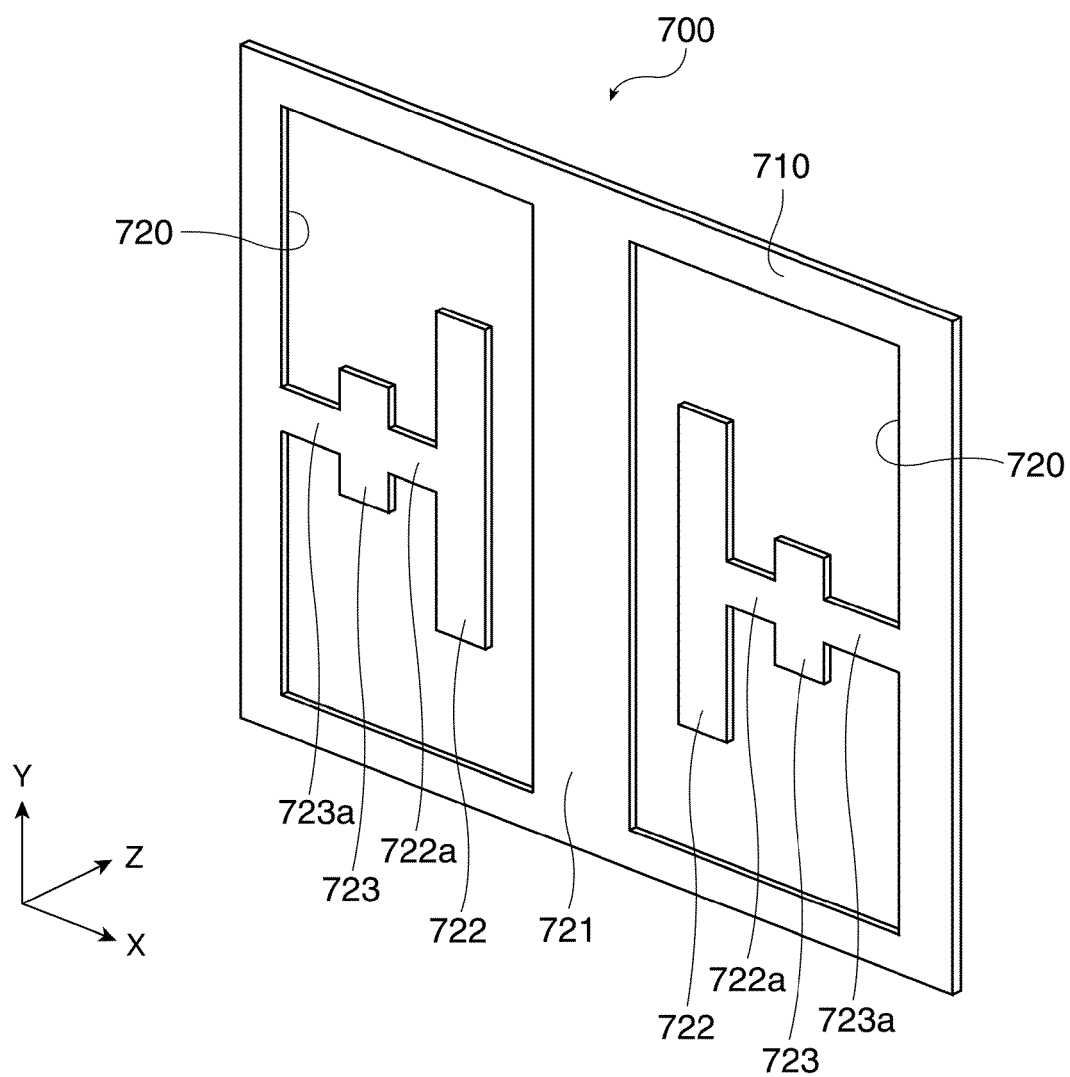
FIG. 7 is a schematic perspective view of a mask used as a jig for forming a thin film on an entrance surface of the polarization conversion element array.
Figure 8:
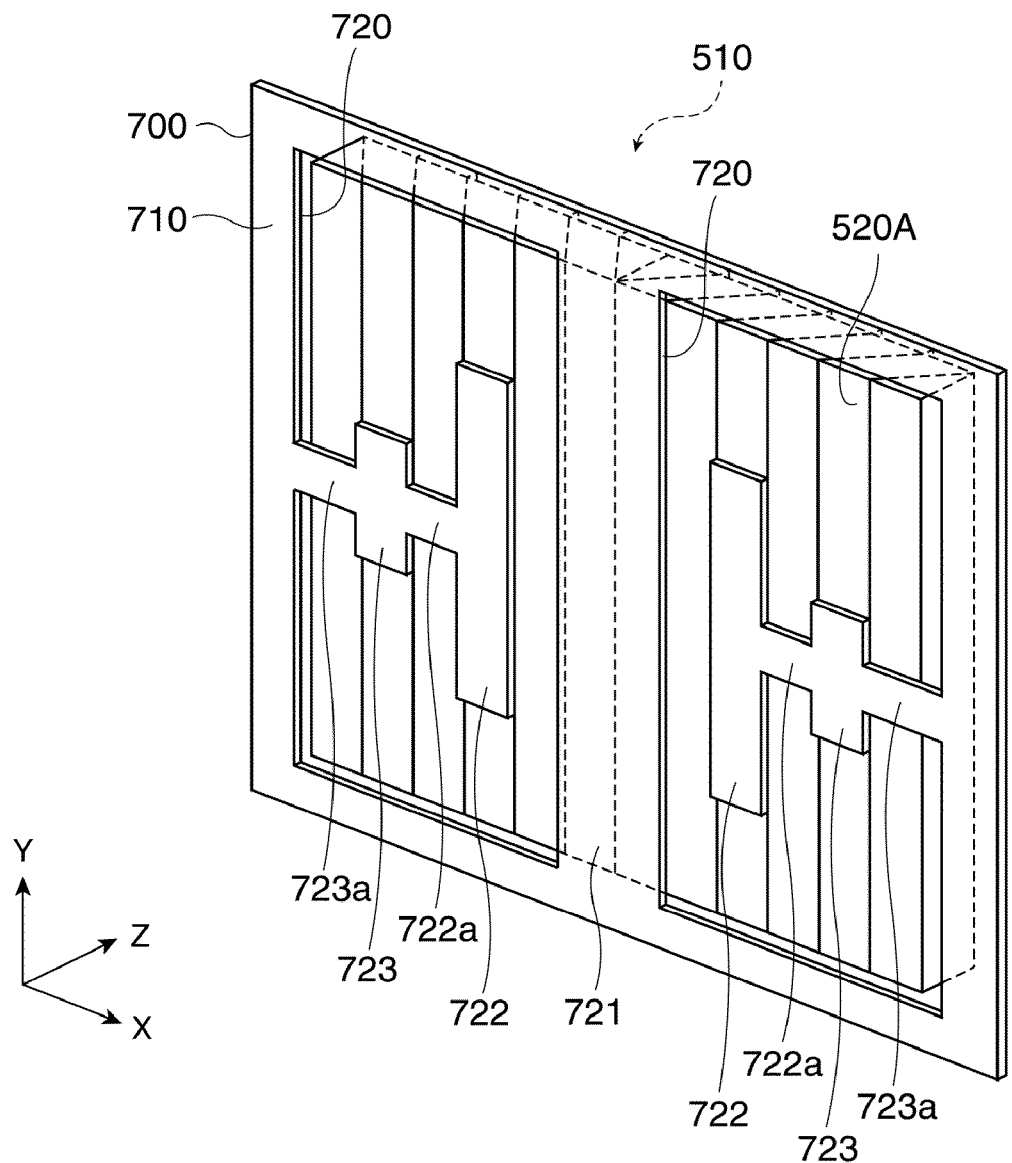
FIG. 8 is a schematic perspective view of the polarization conversion element array in the condition in which the mask is disposed on the entrance surface thereof.

FIG. 7 is a schematic perspective view of a mask used as a jig for forming the thin film on the entrance surface of the polarization conversion element array. FIG. 8 is a schematic perspective view of the polarization conversion element array in the condition in which the mask is disposed on the entrance surface thereof. The formation of the thin film 540 with the mask 700 will be explained with reference to FIGS. 7 and 8.

As shown in FIG. 7, the mask 700 is obtained by providing opening sections 720 to a mask main body 710 having a roughly rectangular thin film shape. After fixing the mask 700 to the entrance surface 520A of the polarization conversion element array 510 as shown in FIG. 8, a vapor deposition process is executed. When executing the vapor deposition process, vapor deposition occurs on the entrance surface 520A facing the opening sections 720 of the mask 700, but does not occur on the other areas of the entrance surface 520A. The shapes of the opening sections 720 of the mask 700 define the shapes of the light shielding sections 542 of the thin film 540.

It should be noted that in order for obtaining the mask 700 formed of a single constituent, in the present embodiment, opening forming areas 722, 723 to be areas for forming the second opening sections 5412 and the third opening sections 5413 of the thin film 540 are coupled via coupling areas 722a, 723a. Further, the connecting opening sections 5412a, 5413a of the thin film 540 are formed in accordance with the coupling areas 722a, 723a. Further, the first opening sections 5411 of the thin film 540 are formed in accordance with the opening forming area 721. According to such a mask 700 described above, the thin film 540 as shown in FIG. 3 is formed on the entrance surface 520A of the polarization conversion elements 520. As the material deposited by the vapor deposition process, aluminum is used in the present embodiment. It should be noted that as the material to be deposited, a single metal material such as gold, silver, copper, or chromium, or an alloy including two or more kinds of metals cited above can also be used besides aluminum.

Figure 9:
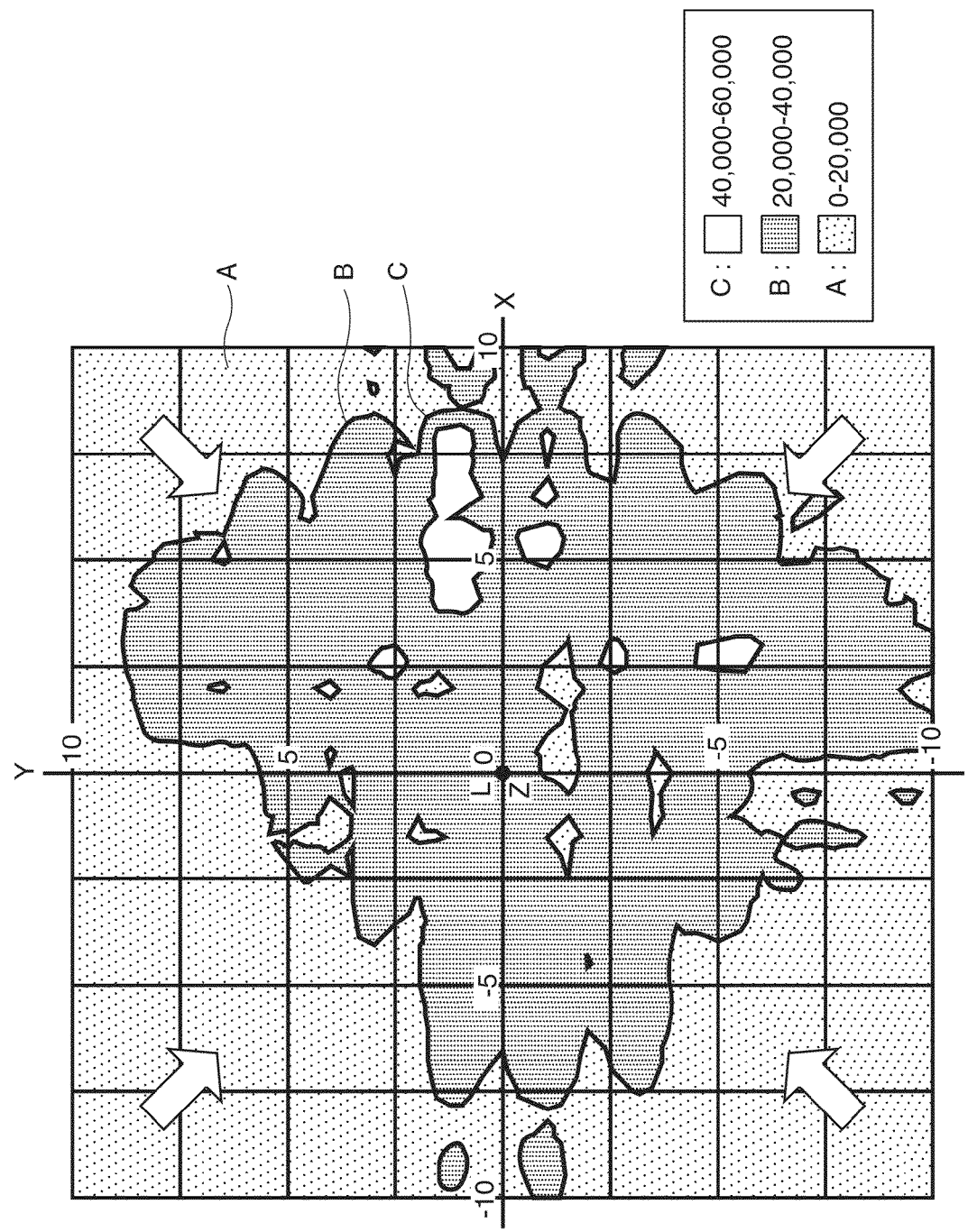

FIG. 9 is a diagram showing a viewing angle characteristic in the contrast the polarization plate is provided with. Further, in detail, FIG. 9 is a diagram obtained by measuring the variation in the contrast between the light beam emitted from the entrance side polarization plate 442A and the light beams emitted from the exit side polarization plate 442B when the light beam emitted from the light source 411 is input through the first lens array 414 and the second lens array 415 in the condition in which the polarization conversion unit not provided with the thin film 540 is used, and the liquid crystal panels 441 and the optical compensation plates 443 are eliminated. Further, a "black" condition is measured with the polarization directions of the entrance side polarization plate 442A and the exit side polarization plate 442B perpendicular to each other. Further, a "white" condition is measured with the polarization directions of the entrance side polarization plate 442A and the exit side polarization plate 442B identical to each other.

It should be noted that FIG. 9 shows a condition viewed from the exit side of the exit side polarization plate 442B toward the light source 411. Further, it is assumed that the illumination light axis L is an intersection between the X-axis (along the lateral direction) and the Y-axis (along the vertical direction), and the line passing perpendicularly through the intersection is defined as the Z-axis direction. Therefore, FIG. 9 also shows the variation in contrast corresponding to the azimuth direction in addition to the viewing angle represented by the coordinates of (X, Y) centered on the Z-axis. It should be noted that the result of measurement within the range of ±10° is plotted as the viewing angle.

In FIG. 9, the area denoted with A represents the range with the contrast of 0 through 20,000, the area denoted with B represents the range with the contrast of 20,000 through 40,000, and the area denoted with C represents the range with the contrast of 40,000 through 60,000. As shown in FIG. 9, the contrast rises when viewed from the direction substantially perpendicular to the surface of the polarization plate 442, namely the Z-axis direction. Further, when viewed from a direction tilted (with a large viewing angle) from the Z-axis direction, the contrast is lowered. Further, the viewing angle dependency of the contrast is reduced when viewed from the axial direction (the X-axis direction and the Y-axis direction) of the polarization plate 442, and is enhanced when viewed from a direction varied from the X-axis direction toward the Y-axis direction, or a direction varied from the Y-axis direction toward the X-axis direction.

In detail, the viewing angle dependency of the contrast when viewed from directions (directions of roughly 45°, 135°, 225°, and 315° counterclockwise around the intersection (the Z-axis) between the X-axis and the Y-axis assuming the positive direction of the X-axis as 0°) indicated by the arrows in FIG. 9 is significant, and the contrast is remarkably lowered as the viewing angle increases. Therefore, it can be understood in the polarization plate 442 that the contrast is degraded if the light beam is input with the azimuth angles θ of about 45°, 135°, 225°, and 315°.

With respect to the polarization plate 442, in the present embodiment, the light shielding sections 542 are formed using the thin film 540 in accordance with the azimuth directions (θ is roughly equal to 45°, 135°, 225°, and 315°) degrading the contrast. In detail, as shown in FIG. 3, in accordance with the azimuth directions with θ roughly equal to 45°, 135°, 225°, and 315°, the light shielding sections 542 are formed above and below (in the Y-axis direction) the second opening sections 5412 and the third opening sections 5413 in the effective entrance areas 520B in which the second opening sections 5412 and the third opening sections 5413 are formed.

As described above, by reducing the light intensity of the light beams entering from the azimuth directions with θ roughly equal to 45°, 135°, 225°, and 315°, the viewing angle characteristic of the entrance side polarization plate 442A and the exit side polarization plate 442B is improved, thereby improving the contrast.

It should be noted that as described above, the light shielding sections 542 using the thin film 540 are formed in accordance with the azimuth directions (the azimuth directions with θ roughly equal to 45°, 135°, 225°, and 315°) with which the contrast of the polarization plate 442 is degraded, and reduce the intensity of the light beam entering from the azimuth directions. In other words, the opening sections 541 of the thin film 540 are formed in the areas corresponding to the azimuth directions (the X-axis direction and the Y-axis direction) with which the contrast of the polarization plate 442 is preferable, thereby making the brightness of the areas higher than that of the areas corresponding to the azimuth directions (the azimuth directions with θ roughly equal to 45°, 135°, 225°, and 315°) tilted from the polarization axis of the polarization plate 442.

Further, in other words, as shown in FIG. 3, the opening sections 541 of the thin film 540 are formed so that in the entrance surface 520A, the F-number (the brightness) expected from the liquid crystal panels 441 with respect to the areas corresponding to the polarization axis direction of each of the entrance side polarization plate 442A and the exit side polarization plate 442B becomes smaller (brighter) compared to the F-number (the brightness) with respect to the areas corresponding to the direction tilted from the polarization axis direction.

The following advantages can be obtained in the embodiment described above.

1. According to the projector 1 of the present embodiment, there are provided the second opening sections 5412 and the third opening sections 5413 formed inside the outer shape of the entrance surface 520A, using the thin film 540, and along the effective entrance areas 520B so as to correspond to the effective entrance areas 520B. Thus, since the opening section can be formed inside the outer shape of the entrance surface 520A with an arbitrary shape in addition to the fact that the opening section is formed over the outer shape of the entrance surface 520A along the effective entrance areas 520B so as to correspond to the effective entrance areas 520B to have a stripe shape (e.g., the form of the first opening sections 5411), it becomes easy to adjust the contrast of an image projected on, for example, a screen in accordance with, for example, the viewing angle characteristic of the modulation device 44, thus it becomes possible to improve the contrast. In addition, since the thin film 540 provided with the opening sections 541 and the light shielding sections 542 is formed on the entrance surface 520A, the cooling efficiency of the polarization conversion element array 510 can be improved.

2. According to the projector 1 of the present embodiment, there is adopted a form in which a part of each of the second opening sections 5412 and the third opening sections 5413 reaches the outer shape end of the entrance surface 520A via the connecting opening sections 5412a, 5413a. Thus, in the mask 700 as the jig used for forming the thin film 540 on the entrance surface 520A, the opening forming areas 722, 723 to be the areas for forming the second opening sections 5412 and the third opening sections 5413 can be coupled via the coupling areas 722a, 723a, and therefore, the mask 700 can be formed of a single constituent. Therefore, the formation of the thin film 540 on the entrance surface 520A can efficiently be performed compared to the case of forming the thin film with the mask composed of separate constituents, and the misalignment of each of the opening sections 541 (the first opening sections 5411, the second opening sections 5412, and the third opening sections 5413) with respect to the entrance surface 520A can also be reduced, thus the opening sections 541 can be formed with high accuracy. Further, the yield in forming the thin film 540 can thus be improved, and the cost reduction in forming the thin film 540 can be achieved.

3. According to the projector 1 of the present embodiment, there is adopted a form in which a part of each of the second opening sections 5412 and the third opening sections 5413 reaches the outer shape end of the entrance surface 520A via the connecting opening sections 5412a, 5413a formed in the ineffective entrance areas 520C. However, since the light shielding sections 552 of the light shielding plate 550 can shield the areas (the connecting opening sections 5412a, 5413a) formed in the ineffective entrance areas 520C, it is possible to prevent the light beams from entering the connecting opening sections 5412a, 5413a.

4. According to the projector 1 of the present embodiment, the light shielding sections 542 of the thin film 540 are formed by depositing aluminum with a vapor deposition process. Thus, when cooling the polarization conversion element array 510 by starting a cooling fan (not shown) disposed inside the projector 1, since the thin film 540 made of metal has good thermal conductivity, the cooling efficiency can be improved.

5. According to the projector 1 of the present embodiment, the opening sections 541 of the thin film 540 are formed in accordance with the contrast viewing angle characteristic of the polarization plate 442 used so that in the entrance surface 520A, the F-number with respect to the areas corresponding to the polarization axis direction of each of the entrance side polarization plate 442A and the exit side polarization plate 442B becomes smaller compared to the F-number with respect to the areas corresponding to the direction tilted from the polarization axis direction. In detail, since the intensity of the light beam entering in the azimuth directions with θ roughly equal to 45°, 135°, 225°, and 315° is reduced with the light shielding sections 542 of the thin film 540, it is possible to improve the contrast viewing angle characteristic of the entrance side polarization plate 442A and the exit side polarization plate 442B, although the light intensity of the entire image to be projected is reduced at a certain proportion, the contrast can be enhanced at a greater proportion.

6. According to the projector 1 of the present embodiment, since the opening sections 551 of the light shielding plate 550 are formed to have opening areas with the same lengths as each other, even in the case in which the optical system used in the projector is different, and therefore the shape of the opening sections of the thin film is different, it becomes possible to use commonly the light shielding plate 550 of the present embodiment. Thus, it is also possible to reduce the manufacturing cost of the polarization conversion unit.

It should be noted that the embodiment describe above is not a limitation, but it is possible to put the embodiment into practice added with various modifications or improvements. Some modified examples will be described below.

MODIFIED EXAMPLE 1

In the embodiment described above, the light shielding sections 542 of the thin film 540 is formed of a thin film 540 made of metal (aluminum). However, this is not a limitation, but the light shielding sections of the thin film can also be formed of a dielectric multilayer film for shielding at least a part of the wavelength band in the wavelength band of the incident light beams. The dielectric multilayer film can be formed by executing coating on the entrance surface 520A using the same mask as in the embodiment described above, for example.

Since the white balance can be adjusted with respect to the color temperature of the light beams (the incident light beams) emitted by the light source 411 by using such a dielectric multilayer film for the light shielding sections of the thin film to shield at least a part of the wavelength band in the wavelength band of the incident light beams, the color balance of the entire image projected on the screen or the like can be adjusted. Further, similarly to the case of the embodiment described above, it is also possible to shield the entire wavelength band (the visible light) of the incident light beams.

Figure 10:
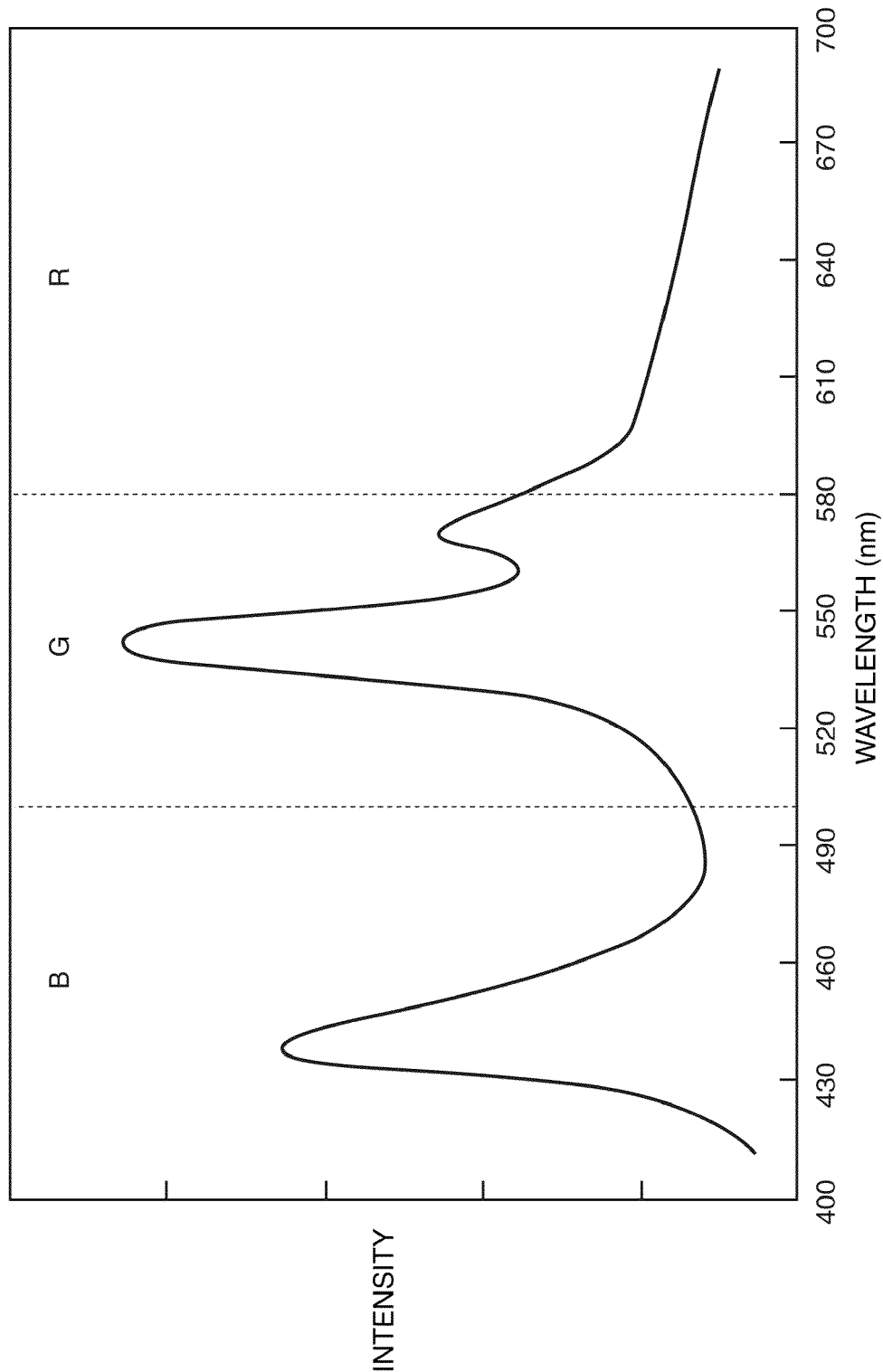
FIG. 10 is a diagram showing the spectrum characteristic of a light beam emitted from a light source.

FIG. 10 is a diagram showing the spectrum characteristic of the light beam emitted from the light source. The light beam emitted from the light source (the light source 411 in the present embodiment) used in the projector has a light intensity ratio as shown in FIG. 10, in which the green light (G) is the highest, the blue light (B) is the second highest, the red light (R) is the lowest. Therefore, the light beam emitted is high in color temperature, and appears bluish white. Therefore, it is preferable that the dielectric multilayer film further shields the wavelength band of at least the green light and the blue light of the incident light beam. Thus, since the light intensity ratio of the red light can relatively be increased by shielding (reflecting) the green light and the blue light and transmitting the red light, it is possible to lower the color temperature of the light beam emitted, and to adjust the white balance toward a reddish white color.

It should be noted that in the case of forming the dielectric multilayer film described above on the entrance surface 520A, it is preferable that the areas corresponding to the ineffective entrance areas 520C of the entrance surface 520A is formed as the dielectric multilayer film shielding the entire wavelength band (visible light) of the incident light beams. Thus, the polarization conversion element array capable of shielding the light beams entering the ineffective entrance areas 520C, and at the same time, coping with either of the cases of using the light shielding plate 550 and of not using the light shielding plate 550 is realized.

MODIFIED EXAMPLE 2

In the embodiment described above, the areas of the second opening sections 5412 are formed to have a longer vertical size than the areas of the third opening sections 5413. However, this is not a limitation, but it is possible to appropriately set the vertical lengths of the areas of the second opening sections 5412 and the third opening sections 5413 in accordance with the contrast viewing angle characteristic of the polarization plates 442, and further, it is also possible to set the vertical lengths of the areas of the second opening sections 5412 and the third opening sections 5413 to be the same.

MODIFIED EXAMPLE 3

In the embodiment described above, the light shielding plate 550 is disposed for shielding the incident light beam to the connecting opening sections 5412a, 5413a formed in the ineffective entrance areas 520C for connecting the part of the each of the second opening sections 5412 and the third opening sections 5413 to the outer shape end of the entrance surface 520A. However, this is not a limitation, but it is possible to form the mask of separate components to eliminate the connecting opening sections 5412a, 5413a. In this case, the light shielding plate 550 is not necessarily used. Further, in the case of not using the light shielding plate 550, the polarization conversion related components (including the light shielding plate 550 and the peripheral fixing members) can be eliminated, and the assembling cost of the polarization conversion unit can also be reduced.

MODIFIED EXAMPLE 4

In the embodiment described above, the incident light beams to the connecting opening sections 5412a, 5413a formed in the ineffective entrance areas 520C are shielded with the light shielding plate 550. However, in the present form, the light shielding plate 550 is not necessarily used. When the light beams are input from the connecting opening sections 5412a, 5413a, the reflecting films 522 function as the polarization splitting films, and the polarization splitting films 521 function as the reflecting films. Therefore, the light beams input from the connecting opening sections 5412a, 5413a are emitted as the P-polarized light beams. Therefore, it is also possible to set the vertical widths of the connecting opening sections 5412a, 5413a to be the minimum possible width for coupling the mask 700 by the coupling areas 722a, 723a, thereby forming them as narrow as possible, and eliminating the light shielding plate 550. In this case, since the light beams entering through the connecting opening sections 5412a, 5413a are absorbed by the retardation plates 530, the polarization plates 442, and so on as heat, if it is confirmed that the heat is within the allowable range (temperature warranty range) of the cooling by the cooling fan, it is also possible to eliminate the light shielding plate 550.

MODIFIED EXAMPLE 5

Although in the embodiment described above the opening sections 551 of the light shielding plate 550 have the opening areas with the same lengths as each other, it is also possible to have similar opening areas to the opening sections 541 (the first opening sections 5411, the second opening sections 5412, and the third opening sections 5413) formed in the thin film 540. Thus, the ineffective light beams can further be shielded.

MODIFIED EXAMPLE 6

Although in the embodiment, the projector 1 using three liquid crystal panels 441 in the light modulation device is explained, this is not the limitation. For example, it can be applied to a projector using only one liquid crystal panel, a projector using two liquid crystal panels, or a projector using four or more liquid crystal panels.

MODIFIED EXAMPLE 7

Although in the embodiment described above there are used the transmissive liquid crystal panels 441, a reflective light modulation device such as a reflective liquid crystal panel can also be used.

MODIFIED EXAMPLE 8

Although in the embodiment described above the discharge lamp is used as the light source 411, this is not a limitation, but a light emitting diode (LED) or the like can also be used as the light source.

MODIFIED EXAMPLE 9

Although the projector 1 of the embodiment described above applies the invention as a projector of the front type, the invention can also be applied to the rear type projector having a screen as the projection object surface integrated therein.

The entire disclosure of Japanese Patent Application No. 2008-209522, filed Aug. 18, 2008 is expressly incorporated by reference herein.

What is claimed is:

1. A projector comprising:
a light source;
a polarization conversion element array having an entrance surface on which an effective entrance area and an ineffective entrance area are disposed to form stripes, an incident light beam emitted from the light source being required to pass through the effective entrance area, but not to pass through the ineffective entrance area;
a modulation device adapted to modulate a linearly polarized light beam emitted from the polarization conversion element array in accordance with an image signal;
a projection device adapted to project the modulated light beam;
thin film provided on a part of the entrance surface, the thin film including light shielding sections adapted to shield parts of the effective entrance area from the incident light beam;
opening sections that are located on other areas of the entrance surface than the parts on which the light shielding sections are provided, at least a part of the opening sections reaching an end of the entrance surface; and
a light shielding plate having opening sections and light shielding sections, the opening sections each being formed like a stripe corresponding to the effective entrance area, and the light shielding sections being formed like stripes corresponding to the ineffective area and adapted to block the incident light beam.

2. The projector according to claim 1, wherein the thin film is a metallic thin film.

3. The projector according to claim 1, wherein
the thin film is a dielectric multilayer film adapted to shield at least a part of a wavelength band in the wavelength band of the incident light beam.

4. The projector according to claim 3, wherein
the dielectric multilayer film shields at least the wavelength band of green light and blue light of the incident light beam.

5. The projector according to claim 1, wherein
the modulation device includes an entrance side polarization plate to which the linearly polarized light beam is input, a liquid crystal panel adapted to modulate the light beam transmitted through the entrance side polarization plate, and an exit side polarization plate adapted to transmit the light beam modulated by the liquid crystal panel, and
the first opening section of the entrance surface is formed so that an F-number relative to an area corresponding to a polarization axis direction of each of the entrance side polarization plate and the exit side polarization plate becomes smaller compared to an F-number relative to an area corresponding to a direction tilted from the polarization axis direction.

6. A projector comprising:
a light source;
a polarization conversion element array having an entrance surface on which an effective entrance area and an ineffective entrance area are disposed to form stripes, an incident light beam emitted from the light source being required to pass through the effective entrance area, but not to pass through the ineffective entrance area;
a modulation device adapted to modulate a linearly polarized light beam emitted from the polarization conversion element array in accordance with an image signal;

a projection device adapted to project the modulated light beam;

a thin film provided on a part of the entrance surface, the thin film including light shielding sections adapted to shield parts of the effective entrance area from the incident light beam; and a first opening section that is another area of the entrance surface than the part provided with the light shielding sections, at least a part of the first opening section reaching an end of the entrance surface, wherein:

the modulation device includes an entrance side polarization plate to which the linearly polarized light beam is input, a liquid crystal panel adapted to modulate the light beam transmitted through the entrance side polarization plate, and an exit side polarization plate adapted to transmit the light beam modulated by the liquid crystal panel, and the first opening section of the entrance surface is formed so that an F-number relative to an area corresponding to a polarization axis direction of each of the entrance side polarization plate and the exit side polarization plate becomes smaller compared to an F-number relative to an area corresponding to a direction tilted from the polarization axis direction.

* * * * *